United States Patent [19]

Kerr

[11] Patent Number: 4,462,523
[45] Date of Patent: Jul. 31, 1984

[54] DAMAGED CONVEYOR BELT DETECTOR

[75] Inventor: James F. Kerr, Crosswell, Mich.

[73] Assignee: Material Control, Inc., Crosswell, Mich.

[21] Appl. No.: 426,594

[22] Filed: Sep. 29, 1982

[51] Int. Cl.³ .............................................. B65G 43/00
[52] U.S. Cl. ..................................... 198/810; 198/856
[58] Field of Search ........................ 198/502, 810, 856

[56] References Cited

U.S. PATENT DOCUMENTS

| | | | |
|---|---|---|---|
| 2,230,745 | 2/1941 | Eiselstein | 198/856 |
| 2,345,415 | 3/1944 | Nagy, Jr. | 198/856 |
| 2,633,229 | 3/1953 | Miller | 198/856 X |
| 4,002,231 | 1/1976 | Doty | 198/856 X |
| 4,088,222 | 5/1978 | Hart | 198/502 |

FOREIGN PATENT DOCUMENTS 2221296  11/1973  Fed. Rep. of Germany ...... 198/856

Primary Examiner—Joseph E. Valenza
Assistant Examiner—Dennis Williamson
Attorney, Agent, or Firm—Cullen, Sloman, Cantor, Grauer, Scott & Rutherford

[57] ABSTRACT

A mechanical linkage and switch for sensing a torn or damaged portion of a conveyor belt. The detector includes a switch enclosed in a housing and connected to a cable which extends across the bottom of the conveyor adjacent to the conveyor belt. The cable is detachably connected to the housing by a unique ball and socket arrangement, so that when a torn section of a conveyor belt engages the cable the ball is pulled from the socket to trip the switch. The housing isolates the switch from the ambient atmosphere to allow the detector to be used in an explosive environment.

15 Claims, 12 Drawing Figures

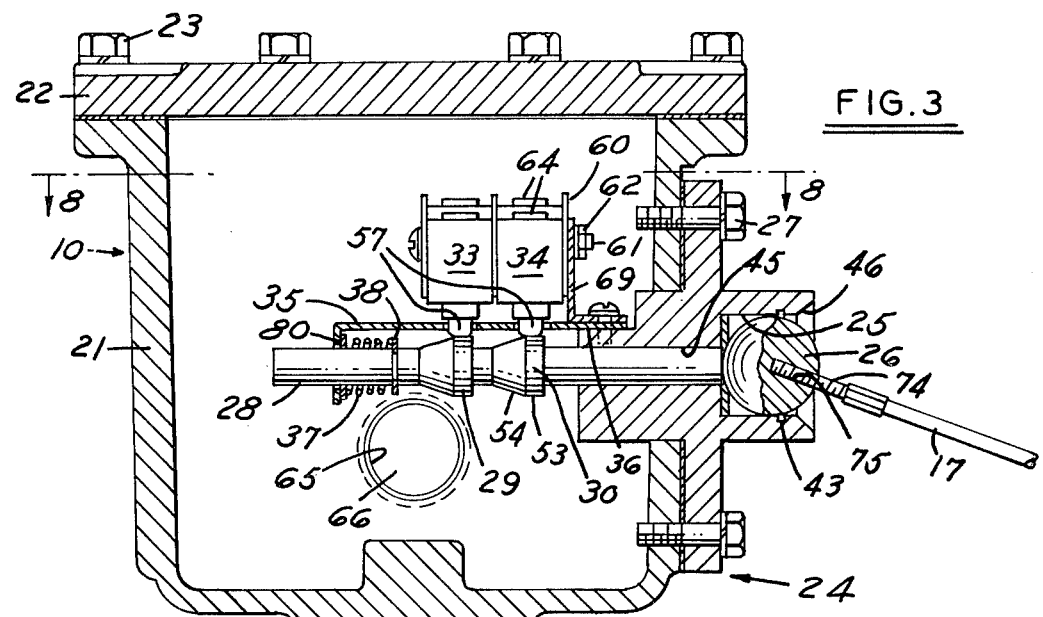
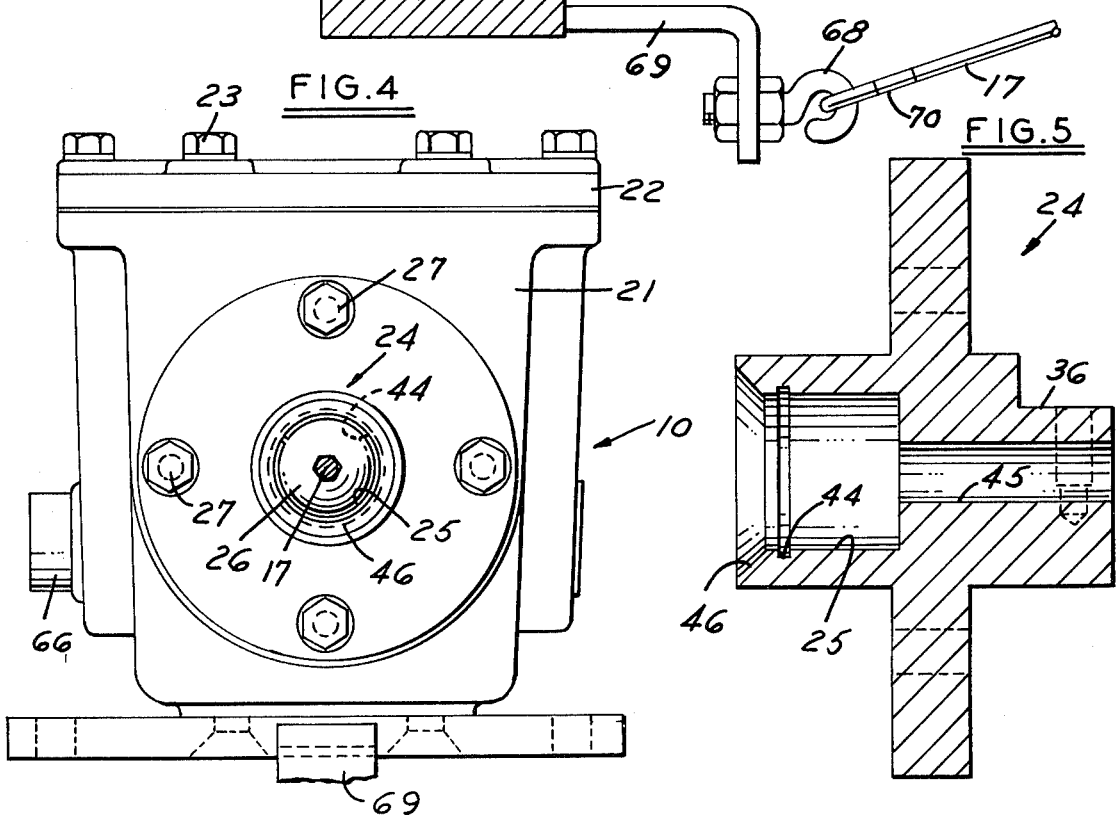
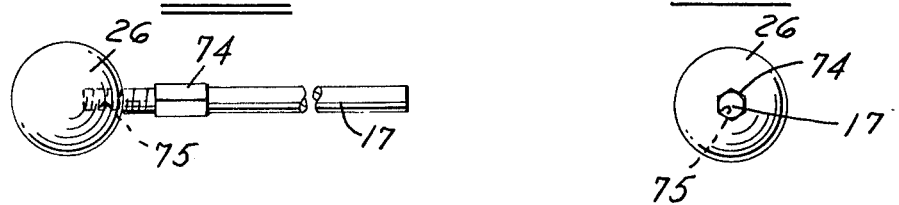

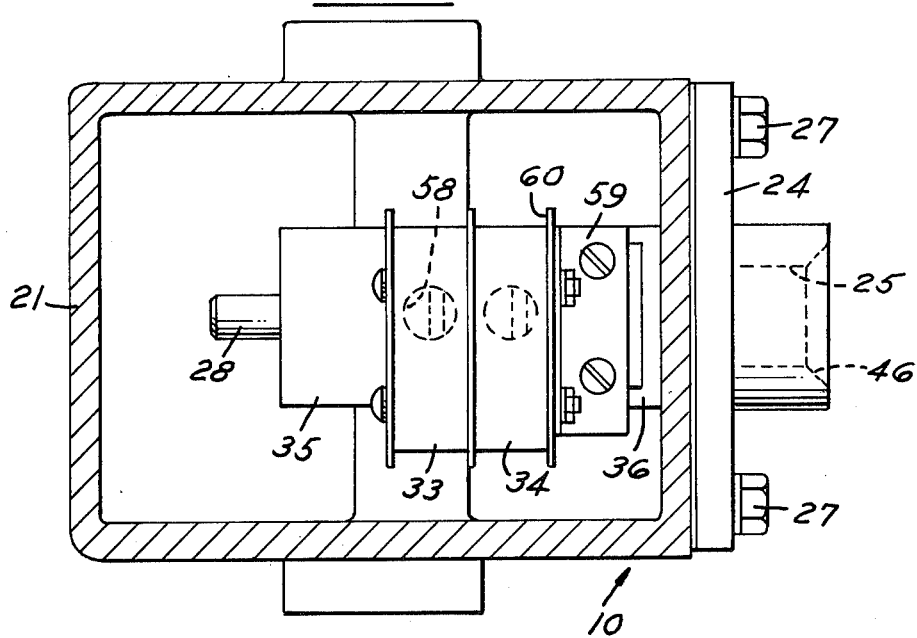
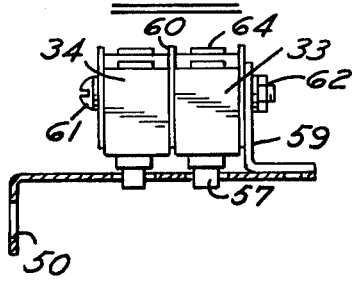
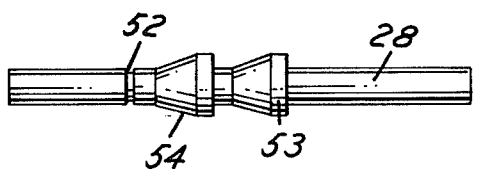
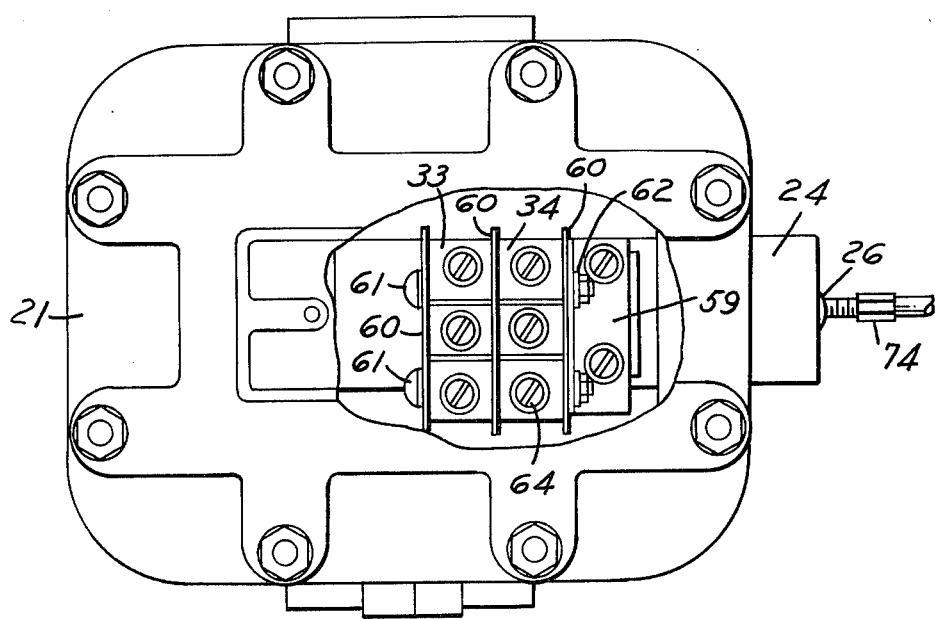

DAMAGED CONVEYOR BELT DETECTOR

BACKGROUND OF THE INVENTION

1. TECHNICAL FIELD

The present invention is related to a damaged conveyor belt detector with a mechanical linkage for sensing damage to a conveyor belt. More particularly, the invention relates to a damaged conveyor belt detector having an improved linkage mechanism which is suitable for use in an explosive environment.

2. PRIOR ART

Belt conveyors normally include a drive pulley and a take-up pulley that are operative to rotate an endless conveyor belt. Belt conveyors are able to move large quantities of many different types of materials efficiently. However, the conveyor belt is subject to wear and must periodically be replaced. While wear is unavoidable in most cases, belt life can be extended by repairing torn or damaged belts.

Conveyor belts may be torn or damaged in small localized areas by improper loading or partial unraveling of a conveyor belt splice. When a conveyor belt tears or is punctured the damaged portion generally hangs downwardly from the upper or lower run of the belt. These hanging portions are commonly referred to as trailers. Trailers frequently become snagged or wrapped about other parts of the conveyor or adjacent machinery. When this occurs, belt wear is aggravated and relatively minor tears or punctures can rapidly be enlarged until the entire belt is destroyed. Trailers also can cause damage to the conveyor structure, the operating mechanism or adjacent machinery. A badly damaged or completely broken belt can act like a giant whip which can destroy much of the conveyor structure.

If a torn or punctured belt is detected while it is still a minor localized tear, frequently the belt can be respliced, patched, or otherwise repaired to prolong the life of the conveyor belt. Repairing conveyor belts results in savings in both machine downtime and conveyor belt replacement costs because it is normally a simple matter to repair a small tear in a conveyor belt.

Various devices have been developed to detect the presence of tears or trailers on conveyor belts. One type of detector utilizes a rigid bar which is mounted below the conveyor belt to be impacted by a trailer. Upon impact the rigid bar trips a microswitch to indicate the existence of a torn section on the conveyor belt. Long trailers whipping under the belt may become entangled on the bar, resulting in increased damage to the conveyor belt. Rigid bar type trailer detectors are also subject to wear and may become bent after a period of use as a result of repeated impact by trailers. The trailer bar is mounted under the conveyor belt and its moving parts are continually subjected to debris and foreign matter falling from the surface of the belt. This dirt and debris increases wear on moving parts and limits the life of such a device.

Another type of damaged conveyor belt detector includes a cable anchored on one side of the conveyor and connected to a jack plug on the other side of the conveyor. The cable is mounted adjacent to the belt so that trailers, torn portions or objects that have punctured the belt will contact the cable and unplug the jack to switch a circuit. Such a cable is less subject to wear from repeated impact by torn belt sections and foreign material, but the jack plug may be damaged if it becomes entangled with a trailer. The jack plug is also subject to wear with repeated use because the prong of the plug is oriented perpendicularly to the direction that a trailer pulls on the cable. In time, the repeated pulling of the jack plug out of the socket loosens the connection until it eventually becomes loose enough to vibrate out of its socket. When this occurs, the detector will either sound a false alarm or shut down the conveyor, requiring a conveyor repairman to needlessly waste time checking the conveyor belt for damage.

In addition, prior art conveyor belt detectors are not suitable for use in environments where explosion proof electrical equipment is required. The jack plugs or switches of prior art detectors may result in sparks or arcing that cannot be tolerated in explosive environments.

The present invention is directed to overcoming all of the above problems and achieving other advantages not realized in prior damaged conveyor belt detectors.

SUMMARY OF THE INVENTION

The present invention relates to a mechanical linkage and switch for detecting torn conveyor belts that is durable in construction and well suited to repeated use. The invention features a simple, wear-resistant operating mechanism that may be used in explosive environments.

The present invention includes a cable running transversely under either the upper or lower run of the conveyor belt and in close proximity thereto for contacting a downwardly hanging trailer or torn portion of the conveyor belt. The cable is anchored on one side of the conveyor and is detachably secured by means of a ball and socket to the opposite side of the conveyor. The ball is removed from the socket when a trailer engages the cable thereby indicating that the conveyor belt is damaged. Removal of the ball from the socket allows a rod or other indirect connecting element to shift and thereby trip a switch mounted in a housing upon which the socket is mounted. The switch in turn activates an alarm, shuts the belt drive off, or otherwise transmits a signal to an electrical circuit to indicate the condition of the belt.

The ball is retained in the socket by means of a annular spring element that resists removal of the ball until a predetermined force is exerted upon the cable. The annular spring element is resilient and therefore is well suited for reuse by simply reinserting the ball in the socket. The annular spring element is preferably formed of spring steel which offers superior resilience and fatigue strength to provide a detector of superior durability.

The ball is mounted on the end of the cable and is preferably a spherical metal ball that will allow trailers to slip over the end. The weight of the steel ball also acts to pull the cable out of the way so that it will not become entangled with the damaged portion of the conveyor belt. Since the conveyor will not become entangled on the ball, operation of the conveyor may resume immediately after inspection or repair.

The rod or connecting element extending from the interior of the housing to the socket is preferably received within an opening in the front of the housing in a close fit relationship which permits the housing to be sealed for use in explosive environments.

In a preferred embodiment, an explosion proof housing encloses the detector switches which engage cam members formed on an elongated push rod. The push rod is slidably mounted and is urged by a spring into the socket when the ball is removed therefrom. When the rod is moved into the socket, the cams on the rod trip the switches thereby generating an electrical signal indicating the existance of a trailer, or damaged portion, on the conveyor belt.

These advantages and other features of the invention will become apparent upon study of the drawings, detailed description, and claims of the invention.

BRIEF DESCRIPTION OF THE DRAWINGS

FIG. 3 is a transverse central cross-sectional view of the detector having a cable anchor for a second detector attached thereto.

FIG. 4 is a front elevational view of the detector.

FIG. 5 is a cross-section of the ball retaining means.

FIG. 6 is a side elevational view of the ball attached to the cable.

FIG. 7 is a front elevational view of the ball and cable from the central axis of the cable.

FIG. 8 is a cross-section plan view taken along the line 8-8 in FIG. 3.

FIG. 9 is a side elevational view of the microswitches and mounting bracket of the present invention.

FIG. 10 is a elevational view of the rod including the switch activating cams.

FIG. 11 is a end view of the rod and cam assembly.

FIG. 12 is a plan view of the detector with a partially broken away section showing the electrical terminals of the microswitches.

DETAILED DESCRIPTION OF THE INVENTION

Figure 1:
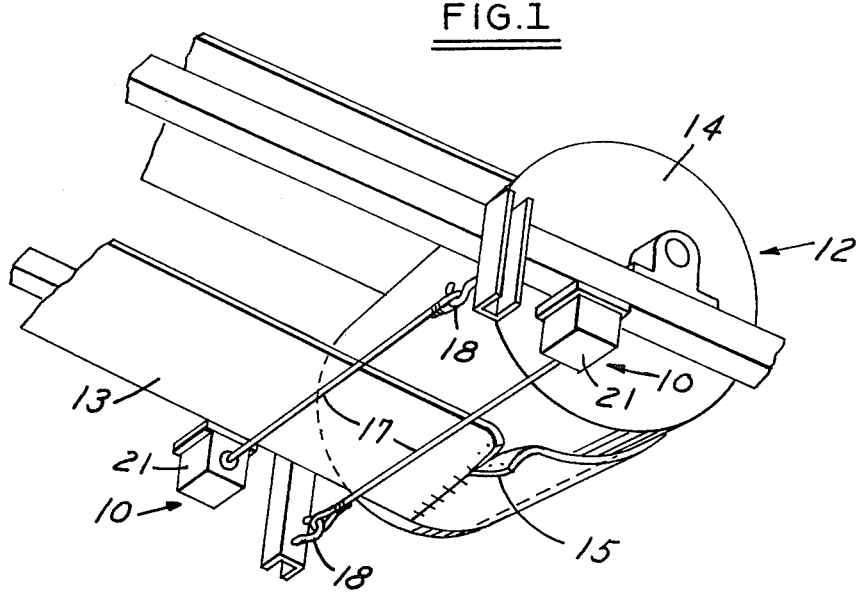
FIG. 1 is a perspective view of one end of a conveyor having the damaged conveyor belt detector of the present invention mounted thereon.

Referring now to FIG. 1, the detector is generally indicated by the reference numeral 10 and is shown mounted on a conveyor 12. The conveyor 12 is a belt conveyor having an endless conveyor belt that is rotated about conveyor rolls 14 by a drive means(not shown). The detector 10 is adapted to sense the presence of a damaged portion 15 of the conveyor belt 13 by means of a cable 17 that extends transversely across the underside of the conveyor 12 from a cable anchor 18 to a switch housing 21. The cable 17 is adapted to be detached from the switch housing 21 when it is contacted by the damaged portion 15 of the conveyor belt 13.

In most cases it is preferred to use two detectors 10, with one detector being located on one side of the belt 13 and the other being located on the opposite side of the belt. Conveyor belts are often damaged at their edges so it is important to monitor damage on both edges. It has been found that the detector 10 is easier to activate when the cable 17 is connected by a trailer near the detector 10. Therefore, by locating a detector 10 on both sides of the conveyor belt 13 damage to either edge of the belt can be more closely monitored. However, one unit may be used alone if cost or space limitations are critical in a given system.

Figure 2:
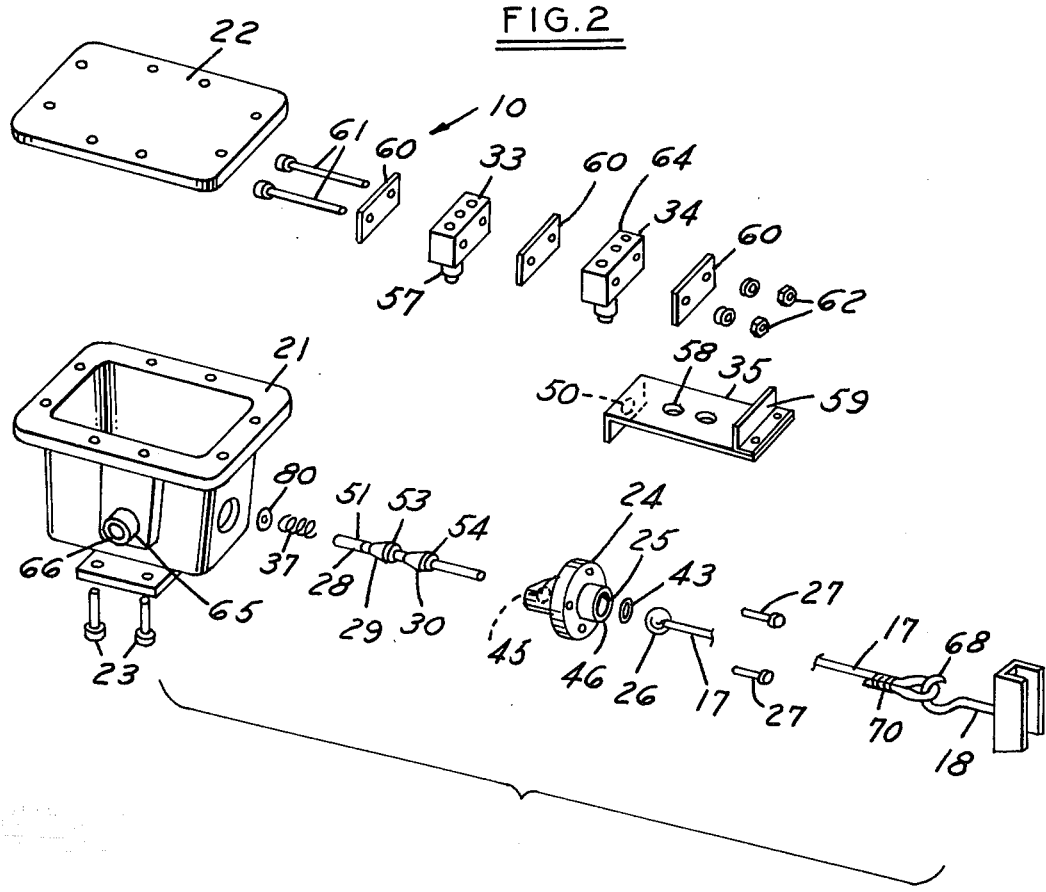
FIG. 2 is an exploded perspective view of the damaged conveyor belt detector of the present invention.

As shown in FIG. 2, the detector 10 includes the switch housing 21 which is a rectangular open top box adapted to be enclosed by a cover plate 22. The switch housing 21 and cover plate 22 are held together by means of fasteners 23. In the preferred embodiment the switch housing 21 and cover plate 22 are cast aluminum parts. However, other materials and forming processes may be used to form the switch housing 21 and cover plate 22.

A ball retaining means 24 is attached to the front of the switch housing 21 and includes a socket 25. A ball 26 is provided on one end of the cable 17 and is sized to be received within the socket 25. The ball retaining means 24 is attached to the switch housing 21 by means of bolts 27.

A rod 28 extends from inside the switch housing 21, through the front of the switch housing 21 and ball retaining means 24 to the socket 25. As shown in FIGS. 3 and 10, the rod 28 includes first and second cams 29 and 30 that are adapted to engage first and second microswitches 33 and 34 which are mounted within the switch housing 21. The rod 28 and first and second cams 29 and 30 may be formed in one unitary piece of the cams may be formed separately and attached to the rod 28 by means of set screws or other fasteners. The rod 28 is received in the rod retaining bracket 35 which is attached to the ball retaining means 24 inside the switch housing 21 on a mounting surface 36. The rod 28 is held by the bracket 35 to move longitudinally into the socket 25 when the ball 26 is pulled therefrom by the cable 17. However, the rod 28 is normally held out of the socket 25 by the presence of the ball 26.

Referring now to FIGS. 2 through 5, the socket 25 is a cylindrical cup shaped portion of the ball retaining means 24 having an inner diameter slightly greater than the ball 26. The ball 26 is retained within the socket 25 by means of a retaining ring 43 which is preferably formed of spring steel but may be fabricated from an equivalent material. The retaining ring 43 is partially received within an annular slot 44 which circumscribes the interior of the socket 25. The annular slot 44 is large enough to permit the retaining ring 43 to expand slightly when the ball 26 is pulled from the socket 25. A rod bore 45 is formed at the base of the cup shaped socket to moveably receive the rod 28 therein. The open end of the socket 25 is a chamfered opening 46 which facilitates insertion of the ball in the socket and also provides relief for some angular offset between the switch housing 21 and the cable anchor 18. The chamfered opening 46 also reduces the amount of resistance exerted by the socket 25 on the ball 26 after the ball has passed the retaining ring 43.

As shown in FIGS. 2, 3, 9, and 10, the rod 28 has one end enclosed within the switch housing 21 and another end which extends through the rod bore 45 and is adapted to slide into the socket 25 when the ball 26 is removed. The end of the rod 28 enclosed in the switch housing extends through a hole 50 formed in a downwardly extending portion of the rod retaining bracket 35. The hole 50 is aligned with the rod bore 45 to permit longitudinal movement of the rod 28.

A spring 37 is retained on one end of the rod 28 to urge the rod toward the ball retaining means 24. A snap ring 51 is secured within an annular groove 52 formed in the rod 28 between the hole 50 in the rod retaining bracket 35 and the ball retaining means 25. The snap ring 51 engages one end of the spring 37 while the other end of the spring 37 engages the washer 80 which is in turn retained in the rod retaining bracket 35 adjacent the hole 50. The spring 37 thus exerts a force against the snap ring 51 toward the socket 25 when the rod 28 is in the position shown in FIG. 3. In this position, the ball 26 is retained within the socket 25 by means of the retaining ring 43. When the ball 26 is removed from the socket 25 the rod 28 is urged by the spring 37 into the socket 25, as shown in phantom lines in FIG. 3. When this occurs, the first and second cams 29 and 30 move relative to the first and second microswitches 33 and 34 to change the condition of, or trip, the switches.

The first and second cams 29 and 30 each include a cylindrical section 53 which holds the switch plungers 57 of first and second microswiches 33 and 34 in their detented positon and a frusto-conical section 54 which provides a transition surface between the cylindrical section 53 and the outer diameter of the rod 28. The frusto-conical surface 54 aids in repositioning the rod in the first position when the ball 26 is reinserted in the socket 25.

Referring now to FIGS. 2, 3, 8, and 9, a switch plunger 57 is provided on each of the first and second microswitches 33 and 34. Holes 58 are provided in the rod retaining bracket 35 for the switch plungers 57 to extend therethrough. First and second microswitches 33 and 34 are retained on a switch retaining bracket 59 on the opposite side of the rod retaining bracket 35 from the rod 28. First and second microswitches 33 and 34 are mounted on the switch retaining bracket 59 with switch separators 60 therebetween. The microswitches and separators are secured together by means of one or more nut 62 and bolt 61.

As shown in FIG. 12, first and second microswitches 33 and 34 have electrical terminals 64 on the top surface thereof for connecting the microswitches in an alarm circuit or other electrical circuit. In addition to an alarm, in some applications it may be desireable to disable the conveyor drive when the belt is torn. This can be done by simply wiring one of the microswitches to a normally closed terminal which opens when the torn conveyor belt is detected. The detector could also be wired to a central control computer to provide information concerning the condition of the conveyor belt.

A conduit opening 65 is preferably formed through the housing 21 to permit electrical wires 66 to be wired therethrough.

Referring now to FIGS. 2 and 3, the end of the cable 17 is attached to the cable anchor 18. The cable anchor 18 preferably includes an eye bolt 68 and, in dual installations, it is generally advantageous to use L-brackets 69 attached to the bottom of both detectors to save space and installation labor. A cable clamp 70 is provided on the end of the cable 17 to provide an anchor point on the cable for securing the cable to the eye bolt 68. The cable anchor 18 in the described embodiment could be provided by various anchoring means that are well known in the prior art.

As shown in FIGS. 6 and 7, one end of the cable 17 is received within a threaded cable end 74 which in turn is securely attached to the ball 26 by means of a threaded bore 75. The ball 26 in the disclosed embodiment is spherical in shape to reduce any possibility that the damaged portion of the conveyor, or trailer, could become entangled thereon. It should be understood that the spherical shape of the ball 26 is merely a preferred embodiment and that the ball may be made in any number of alternative shapes without departing from the invention. However, the spherical shape of the ball compensates for angular misalignment between housing and cable which would not be possible with some other shapes.

In operation, the detector 10 is set up by anchoring one end of the cable on one side of the conveyor and extending the cable 17 across the conveyor adjacent the conveyor belt 13 and inserting the ball 26 into the socket 25. The detector 10 remains in this condition until a damaged portion 15 of the conveyor belt 13 extends downwardly from the conveyor sufficiently to engage the cable 17.

The ball 26 is pulled from the socket 25 when the damaged portion 15 strikes the cable 17 with sufficient force to overcome the restraining force of the restraining ring 43. This action allows the rod 28 to be forced into the socket 25 by the spring 37 pushing against the snap ring 51. When the rod 28 moves from its first position wherein the ball is retained in the socket to its second position wherein the rod 28 is extended into the socket 25, first and second microswitches and their associated switch plungers 57 are permitted to move from their detented position in which they engage the cylindrical section 53 of the first and second cams 29 and 30 to their extended position in which the switch plungers 57 move toward the smaller diameter portion of the rod 28. This movement of the plungers 57 changes the condition of the first and second mcroswitches 33 and 34, causing an alarm circuit and/or condition indicator to be activated or disabled depending upon the purpose the particular circuit.

After corrective measures have been taken, such as repairing a broken splice in the conveyor belt, the ball 26 may be reinserted into the socket 25 to reset the detector 10. When the ball 26 is placed in the socket 25 the rod 28 shifts back into the housing 21 so that the first and second cams 29 and 30 and the first and second microswitches 33 and 34 are once again returned to their first positions. In this way the detector 10 is readied for monitoring the condition of the conveyor belt 13 once again.

The switch housing 21, cover plate 22, ball retaining means 24, and rod 28 are assembled together to define a substantially sealed enclosure for the first and second microswitches 33 and 34. The rod 28 is closely fit into the rod bore 45 to prevent an electrical arc caused by the operation of first and second microswitches 33 and 34 from contacting a potentially explosive environment. First and second microswitches in the disclosed embodiment are electrical switches, however, pneumatic or other types of switches may be used without departing from the invention.

The foregoing is a complete description of a preferred embodiment of the present invention. However, various changes and modifications may be made within the scope of the present invention.

What is claimed is:

1. A damaged conveyor belt detector, for use on a conveyor having and endless belt, comprising:
    means for switching a circuit on and off attached to a first side of the conveyor proximate the endless belt, said switching means being moveable between a first and a second position for opening and closing said switching means;
    means for moving said switching means between a first and a second position;
    a socket attached to the first side of the conveyor and having an open end directed toward said endless belt;
    a ball detachably received within said socket;
    a cable extending across the conveyor below and adjacent to the endless belt from a second side of the conveyor to the ball in the socket on the first side of the conveyor;

switch actuating means slidably received in said socket and cooperating with said switching means to move said switching means from the first position to the second postion in response to detachment of said ball from said socket; and said cable being disposed for engagement with a damaged portion of the endless conveyor belt wherein said ball is detached from said socket when the damaged portion of the endless conveyor belt engages said cable to switch the circuit.

2. In the damaged conveyor belt detector of claim 1: wherein said ball is detachably retained in said socket by a spring clip.

3. In the damaged conveyor belt detector of claim 2 wherein said socket has a chamfered surface at the open end of the socket to facilitate detaching the ball from a range of different angular directions.

4. In the damaged conveyor belt detector of claim 2 wherein said detector is reuseable by reattaching said ball in said socket.

5. In the damaged conveyor belt detector of claim 1 wherein a housing encloses said switching means said switch actuating means comprises:

an elongate rod having an inner end extending inside said housing and an outer end extending through an opening in said housing toward said socket, said elongate rod being moveable longitudinally from a first position wherein the outer end is disposed at the base of said socket to a second position wherein the outer end extends into said socket;

a cam disposed between the inner and outer ends of said rod; and a plunger on said switching means for moving said switching means between the first and second positions, said plunger engaging said cam when the rod is in the first position and disengaging said cam when the rod is in the second position.

6. In the damaged conveyor belt detector of claim 5 wherein said switching means includes first and second switches each including a plunger for moving said switches between their respective first and second positions, and said elongate rod includes two cams mounted thereon for engaging the plungers of first and second switches when said rod is in the first position and disengaging said cam when said rod is in the second position.

7. In the damaged conveyor belt detector of claim 5 wherein said switching means is an electrical microswitch.

8. In the damaged conveyor belt detector of claim 7 wherein said housing defines a sealed enclosure and said rod is received in said opening in a close-fit sliding relationship to permit use of said electrical microswitch in a potentially explosive environment.

9. A damaged conveyor belt detector, for use on a conveyor with a rotatable endless belt comprising:

a housing adapted to be attached to a first side of the conveyor spaced from and adjacent to the endless belt;

a switch enclosed in said housing and having a plunger which is moveable between a first and a second position for closing and opening said switch respectively, said switch being adapted to be connected in a circuit;

a rod extending through an opening in one side of said housing and being shiftable between a first position and a second position, said rod having a cam for holding said plunger in the first position when said rod is in the first position and for releasing said plunger in the second position to allow said plunger to move to the second position;

means for urging said rod from the first position to the second position;

means for holding said rod releasably in the first position being mounted on said one side of the housing; and a cable anchored on a second side of the conveyor spaced from and adjacent to the endless belt, said cable extending transversely across said endless belt and being attached to said holding means, said cable being adapted to be engaged by a damaged portion of said endless conveyor belt hanging downwardly from said endless conveyor belt, wherein upon engagement with the damaged portion said cable causes said holding means to release said rod thereby allowing said urging means to move said rod from said first position to said second position, causing said cam to release the plunger thereby actuating the circuit.

10. In the damaged conveyor belt detector of claim 9: wherein said holding means comprises a ball received in a socket, said ball being detachably retained in said socket by a spring clip.

11. In the damaged conveyor belt detector of claim 10 wherein said socket has a chamfered surface at the open end of the socket to facilitate detaching the ball from a range of different angular directions.

12. In the damaged conveyor belt detector of claim 10 wherein said ball is reattached to said socket to reuse the detector.

13. In the damaged conveyor belt detector of claim 9: a second switch connected in a second circuit for stopping the drive system is mounted in said housing and has a second plunger moveable between a first position and a second position for closing and opening said switch;

a second cam disposed on said rod for holding said second plunger in the first position when said rod is in the first position and for releasing the second plunger to allow said second plunger to move to its second position;

whereby said second switch stops the drive system when said first switch actuates the circuit.

14. In the damaged conveyor belt detector of claim 9 wherein said switch is an electrical microswitch.

15. In the damaged conveyor belt detector belt detector of claim 14 wherein said housing defines a sealed enclosure and said rod is received in said opening in a sealed relationship thereto, for permitting use in a potentially explosive environment.

* * * * *